(12) United States Patent
Heinrichs et al.

(10) Patent No.: US 6,305,721 B1
(45) Date of Patent: Oct. 23, 2001

(54) PLUG-IN COUPLING FOR PRESSURE APPLICATION SYSTEMS

(75) Inventors: Gundolf Heinrichs, Altena; Manfred Berg, Wipperfurth, both of (DE)

(73) Assignee: Armaturenfabrik Hermann Voss GmbH & Co, Wipperfürth (DE)

(*) Notice: Subject to any disclaimer, the term of this patent is extended or adjusted under 35 U.S.C. 154(b) by 0 days.

(21) Appl. No.: 09/277,416

(22) Filed: Mar. 26, 1999

(30) Foreign Application Priority Data

Mar. 28, 1998 (DE) .......................................... 298 05 720 U

(51) Int. Cl.$^7$ .................................................. F16L 19/08
(52) U.S. Cl. .............................. 285/23; 285/39; 285/308; 285/81; 285/321
(58) Field of Search .................................. 285/23, 81, 82, 285/86, 39, 322, 308, 321

(56) References Cited

U.S. PATENT DOCUMENTS

| 4,005,883 | * | 2/1977 | Guest ................................. | 285/322 |
|---|---|---|---|---|
| 4,305,606 | * | 12/1981 | Legris ................................. | 285/39 |
| 4,749,214 | * | 6/1988 | Hoskins ............................... | 285/39 |
| 4,793,637 | * | 12/1988 | Laipply et al. ..................... | 285/39 |
| 5,437,483 | * | 8/1995 | Umezawa ........................... | 285/308 |
| 5,584,513 | * | 12/1996 | Sweeny et al. ..................... | 285/323 |
| 5,727,821 | * | 3/1998 | Miller ................................. | 285/308 |
| 5,934,709 | * | 8/1999 | Morrison ............................ | 285/39 |
| 6,065,779 | * | 5/2000 | Moner et al. ....................... | 285/23 |
| 6,145,887 | * | 11/2000 | Cambot-Courrau ............... | 285/81 |

FOREIGN PATENT DOCUMENTS

| 2413750 | * | 11/1974 | (DE) ................................... | 285/323 |
|---|---|---|---|---|
| 0005865 | | 12/1979 | (EP) . | |
| 2824943 | | 12/1979 | (DE) . | |
| 406074382 | * | 3/1994 | (JP) ..................................... | 285/81 |

* cited by examiner

Primary Examiner—Eric K. Nicholson
(74) Attorney, Agent, or Firm—Harness, Dickey & Pierce, PLC.

(57) ABSTRACT

A plug-in coupling for pressure application systems, including a receiving component, a connector component with a connecting shaft, an expanding cylinder supported on the connecting shaft between a radial step and a limit stop, and a spring unit initially supported on the expanding cylinder. The receiving component defines an opening and has a holding element, which is biased in a closed position and movable to an opened position.

The connecting shaft of the connector component can be inserted into the opening of the receiving component along an insertion direction thereby engaging the radial step with the holding element to prevent loosening of the connector component from the receiving component. In this position, the expanding cylinder is located between the spring unit and the limit stop. The spring unit can be guided over the expanding cylinder in a direction opposite the insertion direction and the expanding cylinder can be moved along the insertion direction thereby disengaging the radial step from the holding element to allow release of the connector component from the receiving component.

15 Claims, 3 Drawing Sheets

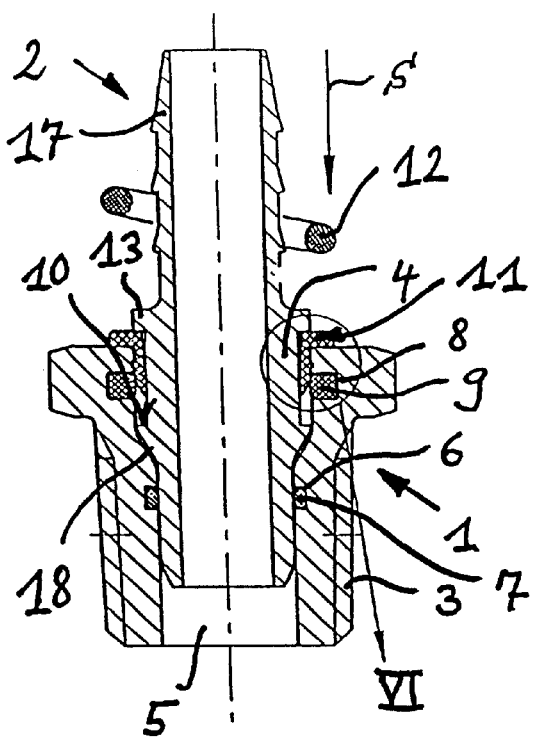
Fig. 5
Fig. 6
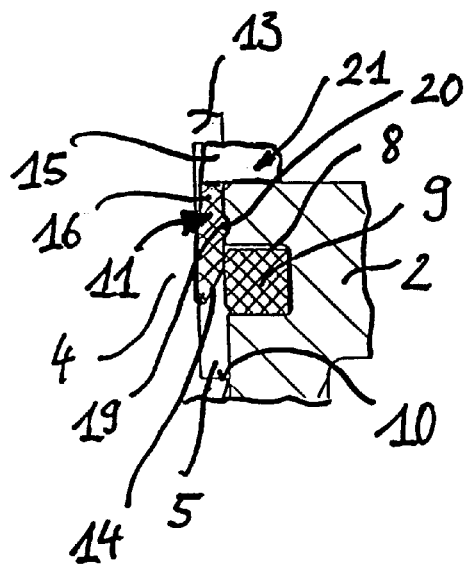
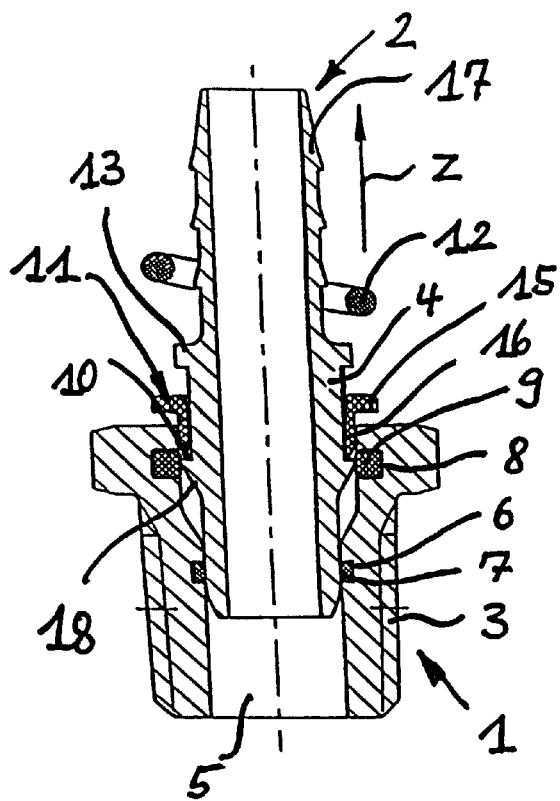
Fig. 7

PLUG-IN COUPLING FOR PRESSURE APPLICATION SYSTEMS

BACKGROUND AND SUMMARY OF THE INVENTION

The present invention relates to plug-in couplings for pressure application systems having a receiving component with an opening and a holding element, a connector component with a connecting shaft, an expanding cylinder supported on the connecting shaft between a radial step and a limit stop, and a spring unit initially supported on the expanding cylinder.

With the conventional plug-in couplings, the connecting shaft of the connector component can be inserted into the opening of the receiving component along an insertion direction thereby engaging the radial step with the holding element to prevent loosening of the connector component from the receiving component.

The conventional plug-in coupling can preferably be used for pipelines and hose pipes in low-pressure systems, such as motor vehicle braking systems, and are well known from the German patent DE 28 24 943 C2. The spring unit serves to generate an axial prestress in the plug-in connection. To release a conventional plug-in connection, the expanding cylinder can be guided into the opening, in a insertion direction, which is opposite the action of the spring unit, and can prop open the holding element to release the arrested radial step of the connecting shaft. In these couplings, different designs for constructing the spring unit are known from the cited German patent and from EP-A-0 005 865. Thus the spring unit can be designed as a helical spring, as a cylindrical protecting sleeve, or as a cylinder of rubber elastic material with an indentation around its perimeter for adjusting the spring characteristic. The conventional plug-in couplings have proven themselves in practice in numerous embodiments. There is room for improvement, however, especially with respect to ease of assembly.

It is the object of the present invention to create a plug-in coupling that has high operational and functional reliability and is simple and economical to manufacture. This is achieved by a plug-in coupling for pressure application systems in which the spring unit can be radial-elastically widened in such a way that it can be guided over the expanding cylinder's largest peripheral contour against the direction of insertion.

With the design of the spring unit in accordance with the invention, this spring unit can be removed from the region of the expanding cylinder to release an existing plug-in connection of connector and receiving components, so that the expanding cylinder advantageously does not have to be pressed into the opening in a direction against the action of the spring unit.

In contrast to the conventional plug-in couplings, the spring unit can be so advantageously designed in this respect that, with the spring unit not removed, the expanding cylinder cannot be pressed so far into the opening in the insertion direction against the action of the spring unit that the arrest is released. In this way, the spring unit also operates simultaneously as a safety catch against unintentional loosening of the connection, so that other safety catches do not have to be provided.

An O-ring can be used as the spring unit in the preferred design. This O-ring preferably works as a multifunction element, which, in addition to its function of applying the axial prestress (spring function) in the plugged-in state through positive fit with the expanding cylinder, also operates as a safety catch against unintentional loosening of the connection (locking function), absorbs vibrations arising from operating conditions, and seals against the entry of dirt.

To simplify its assembly onto the connector component, the expanding cylinder can have a longitudinal slit, preferably enabling it to be radial-elastically widened, whereby an O-ring introduced as the spring unit can then also produce radial prestress of the expanding cylinder, fulfilling another function, and hold the longitudinal slit closed.

Further preferred developmental characteristics of the invention are contained in the appended claims and the following description:

BRIEF DESCRIPTION OF THE DRAWINGS

FIGS. 4–7 are axial views of various phases of the loosening process of the plug-in coupling; and FIG. 6 is an exploded view of the plug-in coupling shown in the detail VI of FIG. 5.

DETAILED DESCRIPTION OF THE PREFERRED EMBODIMENT

Figure 1:
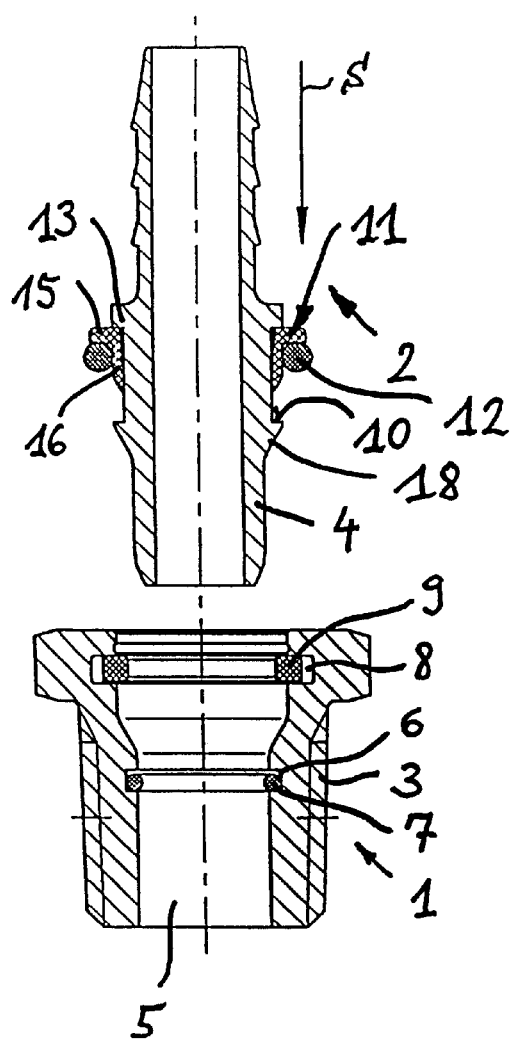
FIGS. 1 and 2 are axial views of two phases of the insertion process of a plug-in coupling in accordance with the invention.

As shown in the drawings, a plug-in coupling in accordance with the invention consists of a receiving component 1 and a connector component 2.

The receiving component 1 can be designed in many ways with regard to shape and material. For low-pressure applications, it preferably consists of plastic. For screwing into other components, the receiving component 1 can have an exterior thread 3, as illustrated.

With a connecting shaft 4 sealed around the perimeter, the connector component 2 can be inserted into an opening 5 of the receiving component 1 in a insertion direction S. A packing ring 7 arranged in a peripheral groove 6 of the receiving component 1 seals the perimeter.

Figure 3:
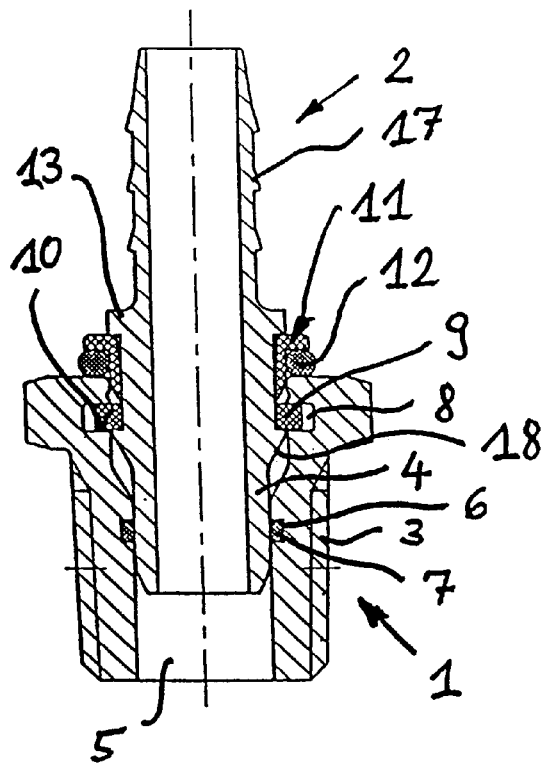
FIG. 3 is an axial view of a plugged-in phase of the insertion process of the plug-in coupling.

A holding element 9 that can be propped open, such as a spreader ring, is located in a recess 8, a spreader ring groove, of the receiving component 1. The holding element 9 can prevent the connector component 2 against loosening the plugged-in, pressure sealed, lock-in position as illustrated in FIG. 3. In this lock-in position, a radial step 10 of the connecting shaft 4 engages the holding element 9, locking them. The connecting shaft 4 carries an axially mobile expanding cylinder 11, behind the radial step 10 in the direction S. In the lock-in position, the expanding cylinder 11 supports itself on the connector component 2 by a coaxially arranged spring unit 12 on one side, and on a limit stop 13, such as a collar, of the connecting shaft 4 on the other side. The expanding cylinder serves to loosen the connection, i.e. to release the lock-in position.

To prop open the holding element 9 when loosening a plug-in connection, the expanding cylinder 11 can preferably have a beveled edge 14 on its front side facing the direction S (FIG. 6). On its opposite face turned away from the insertion direction S, the expanding cylinder 11 can have a flange 15 against which the spring unit 12 can abut.

Figure 4:
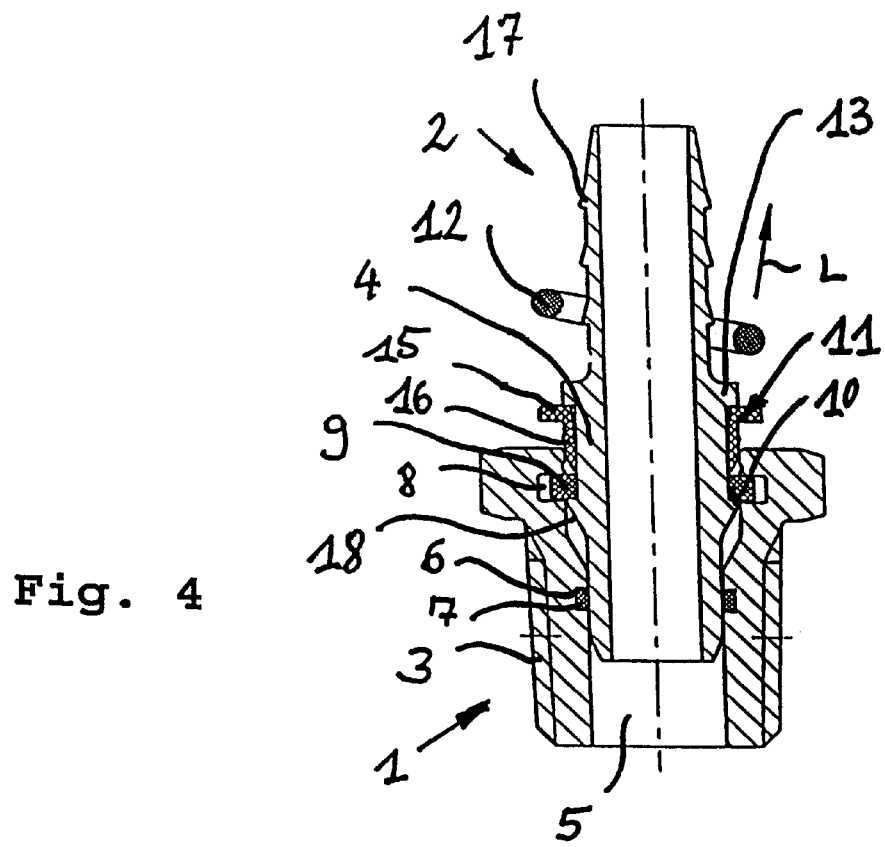

The expanding cylinder 11 can preferably be made of plastic and have a longitudinal slit to guarantee that it can be propped open when assembled onto the connector component 2. The spring unit 12 can be radial-elastically widened in accordance with the invention in such a way that it can be guided over the largest peripheral contour of the expanding cylinder 11, contrary to the insertion direction (in the direction of the arrow L), over its flange 15 for example, as illustrated in FIG. 4.

In the preferred embodiment, the spring unit 12 is designed as an O-ring, preferably bulky, and consists of an elastomer, preferably an ethylene-propylene-diene rubber (EPDM), which distinguishes itself in high light resistance and ozone resistance. With the proper selection of material, the radial-elastic widenability can be adjusted. O-rings with a hardness less than 70, preferably less than 60 Shore A, are especially suitable.

Figure 2:
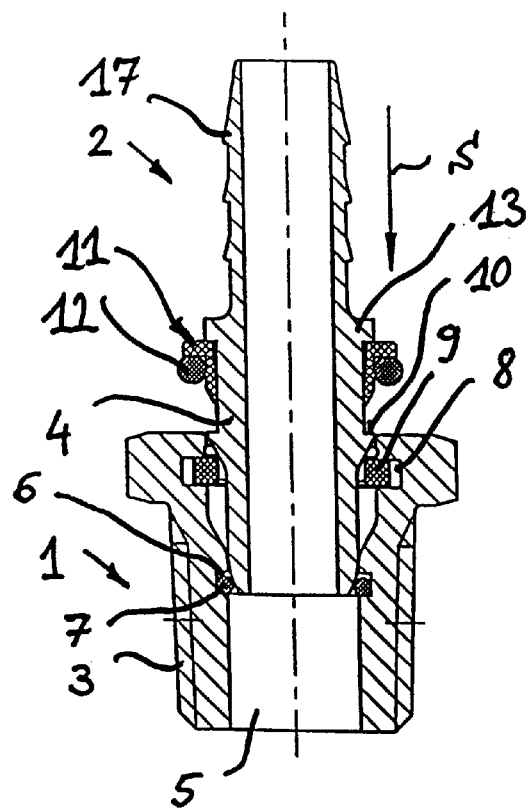

As shown in FIGS. 1 and 2, the spring unit 12 can be shoved opposite the direction S onto the connector component 2 until it abuts against the flange 15 attached to a sleeve-like part 16 of the expanding cylinder 11. FIG. 1 shows that the expanding cylinder 11 and the spring unit 12 (O-ring) are on the connecting shaft 4 between the radial step 10 and the collar that forms the limit stop 13. The inner diameter of the O-ring is only large enough that the slitted expanding cylinder 11 is not widened. When prepared in this way, the connector component 2 can be guided into the receiving component 1.

For connecting a plastic pipeline, a peripheral outline 17 is provided on the side of the connector component 2 opposite the connecting shaft 4. The profile of this peripheral outline 17 may be adapted for connecting a hose. When the connector component 2 is being inserted into the receiving component 1, as shown in FIG. 2, the holding element 9 is propped open into the recess 8 by a conical section 18 which widens up to the radial step and forms part of the connecting shaft 4. The radial step 10 of the connecting shaft 4 then locks with the holding element 9 because the holding element 9 springs back radially inwards. When the plug-in coupling in accordance with the invention is completely inserted, the previously described lock-in position occurs, as shown in FIG. 3.

For intentionally releasing the arrest, the spring unit 12 is removed as shown in FIG. 4, by widening it radially and pulling it in the direction of arrow L, opposite the insertion directions, over the flange 15 of the expanding cylinder 11, and preferably also over the collar of the connecting shaft 4 forming the limit stop 13 for the expanding cylinder 11.

The expanding cylinder 11 can now be moved axially in the direction S, as shown in FIG. 5, whereby it releases the lock between the holding element 9 and the radial step 10 of the connecting shaft by widening the holding element 9. The axial movement of the expanding cylinder 11 can be brought about by reinserting the connector component 2 until the expanding cylinder 11, supported on one side by the limit stop 13 of the connector component 2 strikes the receiving component 1 on the other side.

As shown by the detailed illustration of FIG. 6, the widening of the holding element 9, and particularly the subsequent removal of the connector component 2, is accomplished by providing a boss 19 on the perimeter of the expanding cylinder 11. The boss 19 forms a non-positive connection with a corresponding recess 20, arranged around the perimeter of the receiving component 1, when the holding element 9 is propped open. This connection initially prevents the expanding cylinder 11 from being carried along in the direction Z of the connector component 2 when the connector component 2 is subsequently pulled back, as shown in FIG. 7. The expanding cylinder 11 holds the holding element 9 in its spread-out position in this way until the radial step 10 of the connecting shaft 4 has at least passed the arresting edge of the holding element 9 in the axial direction. The axial length of the sleeve-like part 16 of the expanding cylinder 11 must be dimensioned appropriately. The expanding cylinder 11 is pulled out of the opening 5 of the receiving component 1 together with the connector component 2 by another pull on the connector component 2, because the radial step 10 abuts the expanding cylinder 11.

In an alternative embodiment of the present invention, a slitted annular disk may be used instead of the O-ring of the spring unit 12, and its rubber elasticity can then be less than that of an O-ring. A person of ordinary skill in the art could also provide additional functional features for structural organization of a plug-in coupling in accordance with the invention. For example, the flange 15 of the expanding cylinder 11 may include a recess 21, preferably notch-like, on its perimeter, to make it easier to remove the multifunctionally operating spring unit 12, as shown in FIG. 6.

The foregoing discussion discloses and describes a preferred embodiment of the present invention. A person of ordinary skill in the art will readily recognize from such discussion, and from the accompanying drawings and claims, that changes and modifications can be made to the invention without departing from the true spirit and fair scope of the invention as defined in the following claims.

We claim:

1. A plug-in coupling for pressure application systems, comprising:

a receiving component defining an opening and a recess, and having a holding element secured within said recess, said holding element biased in a closed position, and movable to an opened position;

a connector component having a connecting shaft, said connecting shaft having a radial step engageable with said holding element and a limit stop;

an expanding cylinder supported on said connecting shaft between said radial step and said limit stop, said expanding cylinder including a flange having a recess; and a spring unit initially supported on said expanding cylinder; and wherein said connecting shaft of said connector component is adapted to be inserted into said opening of said receiving component along an insertion direction thereby engaging said radial step with said holding element to prevent loosening of said connector component from said receiving component, and thereby securing said expanding cylinder between said spring unit and said limit stop;

said spring unit is adapted to be widened and guided over said flange in a direction opposite said insertion direction and said expanding cylinder is adapted to be subsequently moved along said insertion direction thereby disengaging said radial step from said holding element to allow release of said connector component from said receiving component.

2. The plug-in coupling of claim 1, wherein said expanding cylinder includes a beveled edge to move said holding element from a closed position to an opened position.

3. The plug-in coupling of claim 1, wherein said expanding cylinder defines a longitudinal slit.

4. The plug-in coupling of claim 1, wherein said expanding cylinder includes a boss and said receiving component includes a corresponding recess such that said boss and said recess form a non-positive connection to facilitate the disengagement of said radial step from said holding element.

5. The plug-in coupling of claim 1, wherein said expanding cylinder is made of a plastic material.

6. The plug-in coupling of claim 1, wherein said spring unit is an O-ring.

7. The plug-in coupling of claim 1, wherein said spring unit is made of an elastomer material.

8. A plug-in coupling for pressure application systems, comprising:

a receiving component defining an opening and a recess, and having a holding element secured within said recess, said holding element biased in a closed position, and movable to an opened position;

a connector component having a connecting shaft, said connecting shaft having a radial step engageable with said holding element, and a limit stop;

an expanding cylinder supported on said connecting shaft between said radial step and said limit stop; and a spring unit comprising an O-ring, said spring unit initially supported on said expanding cylinder;

wherein said connecting shaft of said connector component is adapted to be inserted into said opening of said receiving component along an insertion direction thereby engaging said radial step with said holding element to prevent loosening of said connector component from said receiving component, and thereby securing said expand cylinder between said spring unit and said limit stop; and wherein said spring unit is adapted to be guided over said expanding cylinder in a direction opposite said insertion direction and said expanding cylinder is adapted to be subsequently moved along said insertion direction thereby disengaging said radial step from said holding element to allow release of said connector component from said receiving component.

9. The plug-in coupling of claim 8, wherein said expanding cylinder includes a beveled edge to move said holding element from a closed position to an opened position.

10. The plug-in coupling of claim 8, wherein said expanding cylinder includes a flange, and wherein said spring unit can be widened and guided over said flange.

11. The plug-in coupling of claim 10, wherein said flange includes a recess to facilitate the removal of said spring unit over said flange.

12. The plug-in coupling of claim 8, wherein said expanding cylinder defines a longitudinal slit.

13. The plug-in coupling of claim 8, wherein said expanding cylinder includes a boss and said receiving component includes a corresponding recess such that said boss and said recess form a non-positive connection to facilitate the disengagement of said radial step from said holding element.

14. The plug-in coupling of claim 8, wherein said expanding cylinder is made of a plastic material.

15. The plug-in coupling of claim 8, wherein said spring unit is made of an elastomer material.

* * * * *